United States Patent [19]
Aoyama

[11] Patent Number: 5,663,777
[45] Date of Patent: Sep. 2, 1997

[54] REFLECTION TYPE LIQUID CRYSTAL DISPLAY DEVICE

[75] Inventor: Kaori Aoyama, Yamatokoriyama, Japan

[73] Assignee: Sharp Kabushiki Kaisha, Osaka, Japan

[21] Appl. No.: 579,374

[22] Filed: Dec. 27, 1995

[30] Foreign Application Priority Data

Dec. 28, 1994 [JP] Japan ..................... 6-328738

[51] Int. Cl.$^6$ ............... G02F 1/1333; G02F 1/1335
[52] U.S. Cl. ................. 349/96; 349/87; 349/113; 349/117
[58] Field of Search .............. 437/41; 350/337, 350/338; 357/45; 355/3; 359/56, 63, 58, 73; 361/760; 174/250; 349/87, 96, 113, 117

[56] References Cited

U.S. PATENT DOCUMENTS

| | | | |
|---|---|---|---|
| 4,671,642 | 6/1987 | Ohkubo et al. | 355/3 |
| 4,767,723 | 8/1988 | Hinsberg, III et al. | 437/41 |
| 4,818,074 | 4/1989 | Yokoi et al. | 350/338 |
| 4,952,030 | 8/1990 | Nakagawa et al. | 350/337 |
| 4,984,873 | 1/1991 | Takiguchi et al. | 350/337 |
| 5,126,866 | 6/1992 | Yoshimizu et al. | 359/63 |
| 5,157,470 | 10/1992 | Matsuzaki et al. | 357/45 |
| 5,227,900 | 7/1993 | Inaba et al. | 359/56 |
| 5,235,450 | 8/1993 | Yoshimura et al. | 359/63 |
| 5,239,365 | 8/1993 | Inoue | 356/364 |
| 5,337,174 | 8/1994 | Wada et al. | 359/73 |
| 5,442,224 | 8/1995 | Yoshimizu et al. | 359/58 |
| 5,478,971 | 12/1995 | Gotou et al. | 361/760 |

FOREIGN PATENT DOCUMENTS

| | | |
|---|---|---|
| 56-130715 | 10/1981 | Japan . |
| 4-14329 | 3/1992 | Japan . |
| 6-281927 | 10/1994 | Japan . |

*Primary Examiner*—William L. Sikes
*Assistant Examiner*—Julie Ngo
*Attorney, Agent, or Firm*—David G. Conlin; William J. Daley, Jr.

[57] ABSTRACT

It is an object of the invention to enhance the brightness of the display screen of the reflection type liquid crystal display device of positive reflection type. A liquid crystal panel of active matrix type is interposed between a first polarizing plate of high degree of polarization and a second polarizing plate of low degree of polarization. A reflector with reflectance of 60% or more with small change in reflectance within visible ray region is disposed to be opposed to the liquid crystal panel via the second polarizing plate. On one substrate member of the liquid crystal panel, MIM elements, signal wirings, and light transmitting pixel electrodes are disposed. On other substrate member, light permeable electrodes integrating scanning wiring and counter electrodes are disposed.

4 Claims, 11 Drawing Sheets

CL:CM=10:1

TO SPECTRAL SENSOR
104
101
105 → TO SPECTRAL SENSOR
102
103

LIGHTNESS
106
107
108
109

REFLECTION TYPE LIQUID CRYSTAL DISPLAY DEVICE

BACKGROUND OF THE INVENTION

1. Field of the Invention

The present invention relates to a reflection type liquid crystal display device employing an active matrix drive system.

2. Description of the Related Art

Liquid crystal display devices are widely used as display device, not only in relatively small display capacity apparatuses such as small electronic desktop calculator and digital clock, but also in large display capacity apparatuses such as word processor or personal computer.

The display methods of liquid crystal display devices are classified by the shapes of the electrodes used in the display devices, into the segment type display suited to display of numerals, symbols and simple graphic patterns, and the matrix type display capable of displaying an arbitrary graphic pattern.

As the driving system of a liquid crystal display device having a segment type display, for example, a duty drive system or a static drive system may be employed. As a drive system of a liquid crystal display device having a matrix type display, for example, an active matrix drive system may be employed. In the active matrix drive system, switching elements and, if necessary, signal storing means are provided in pixels arranged in a matrix form, and the signals given to the wirings connected to pixels are supplied to each pixel and cut off individually by each pixel. As switching elements, for example, three-terminal elements such as a thin film transistor (TFT) and a field effect transistor (FET), and two-terminal elements such as a diode and a metal-insulator-metal (MIM) element are used. When the active matrix drive system is used in the twisted nematic (TN) type liquid crystal display device, a display screen of higher contrast is obtained, in comparison with the liquid crystal display device of different drive system from the active matrix driving system, for example, a liquid crystal display device of simple matrix driving system.

FIG. 12 is a sectional view showing a simplified constitution of a reflection type liquid crystal display device in the prior art. In this liquid crystal display device, a first polarizing plate 2 and a second polarizing plate 3 are provided on both sides of a liquid crystal panel 1. A reflector 4 is provided to be opposed to the liquid crystal panel 1 via the second polarizing plate 3. The transmission axes of the first and second polarizing plates 2, 3 are selected to be orthogonal or parallel to each other.

In the structure of the liquid crystal panel 1, between a pair of substrate members 5, 6, a TN type liquid crystal layer 7 in which direction of liquid crystal molecular axis is twisted by 90 degrees from one substrate member to the other substrate member is interposed. FIG. 13 is a partial plan view of one pixel of the liquid crystal panel 1. The region indicated by alternate long and two short dashes 10 is a region of one pixel.

The substrate member 5 comprises pixel electrodes 12 disposed in a matrix form on the surface of the substrate 11 facing the liquid crystal layer 7, signal wirings 13 disposed parallel to each other on every row or column of the pixel electrodes 12, and MIM elements 14 as switching elements for connecting the respective pixel electrodes 12 and signal wirings 13. Furthermore, an orientation film (not shown) is formed so as to cover the pixel electrodes 12, signal wirings 13, and MIM elements 14.

FIG. 14 is a partial sectional view of the substrate member 6. Referring to FIGS. 13 and 14, the substrate member 6 comprises counter electrodes 17 provided in a band form having a width confronting nearly an overall width of the pixel electrodes 12 in one row or one column in a direction orthogonal to the signal wiring 13, on the surface of the substrate 16 facing the liquid crystal layer 7, and scanning signal wirings 18 connected to the counter electrodes 17, which are arranged in parallel to the counter electrodes 17 at both ends of the respective counter electrodes 17 in a direction orthogonal to the longitudinal direction of the counter electrodes 17. Furthermore, an orientation film (not shown) is formed so as to cover the counter electrodes 17 and scanning wirings 18.

The transmission axes of the first and second polarizing plates 2, 3 are selected, for example, in the positive reflection type, so as to coincide with the orientation treating direction of the orientation films of the substrate members 6, 5 of the polarizing plates 2, 3 side. That is, the transmission axes of the first and second polarizing plates 2, 3 are orthogonal to each other. Therefore, in the state that voltage application is not carried out for the pixel electrode 12 and counter electrode 17 of one pixel on the liquid crystal panel 1, since the incident light from the first polarizing plate 2 side is propagated along the liquid crystal molecular axis in yhe liquid crystal layer 7 in the liquid crystal panel 1, the polarization direction of the light is changed by 90 degrees and the incident light passes through the second polarizing plate 3. The light is then reflected by the reflector 4, and gets into the liquid crystal panel 1 again. The polarization direction of the light is changed again by 90 degrees in the liquid crystal layer 7 in the liquid crystal panel 1, and the passes through the first polarizing plate 2 to exit.

When a predetermined voltage is applied to electrodes of the liquid crystal panel 1, electric fields are generated among the electrodes. At this time, the liquid crystal molecular array of the liquid crystal layer 7 existing in the electric field varies, and the liquid crystal molecular axis runs along the electric field direction, and hence optical rotary power for varying the direction of polarization of the light is lost. At this time, the direction of polarization of the light entered from the first polarizing plate 2 side is not changed, and hence the light cannot pass through the second polarizing plate 3. Accordingly, the light is not reflected by the reflector 4, and is not emitted from the first polarizing plate 2 side. Therefore, in the liquid crystal display device of the positive reflection type, displaying is achieved by the color of the display screen when voltage is not applied, that is, the white color when the light passes, and the color of the display screen when voltage is applied, namely, the black color when the light is blocked.

In the TN type liquid crystal display device, an art for preventing the contrast of the display image from varying depending on a viewing angle direction of the display screen is disclosed in Japanese Examined Patent Publication JP(B2) 4-14329 (1992). The viewing angle direction is the direction which a user observes the display screen, and it is expressed by the angle inclined from the vertical direction to the horizontal direction, relatively to the display surface of the device. In the prior art of this publication, the refractive index $\Delta n$ of the liquid crystal material for forming the liquid crystal layer 7 and the thickness d of the liquid crystal layer 7 are selected so that their product $\Delta n \cdot d$ may be 210 nm to 600 nm.

The present applicant also proposed an art for improving the display contrast curve, in a multi-layer TN type liquid crystal display device using plural liquid crystal panels, in Japanese Unexamined Patent Publication JPA 58-130715 (1981). The liquid crystal display device of this prior art has plural TN type liquid crystal panels laminated and interposed between a pair of polarizing plates, in the light incidence direction. In this prior art, the transmission axes of the pair of polarizing plates or the directions orthogonal to the transmission axes are disposed by deviating the twist angle of the liquid crystal molecule in the decreasing direction by 3 degrees to 15 degrees, to the direction of the major axis of the liquid crystal molecule closest to the orientation film of the substrate member of the polarizing plate side in the liquid crystal panel closest to the substrates.

In the transmission type liquid crystal display device of the TN type, moreover, an art for heightening the contrast of the display screen and brightening the display screen is disclosed in Japanese Unexamined Patent Publication JPA 6-281927 (1994). In the liquid crystal display device of this prior art, a TN type liquid crystal panel of the same constitution as used in the reflection type liquid crystal display device in FIG. 12 is interposed between a pair of polarizing plates. In this device, light enters from one of the pair of polarizing plates, and the direction of polarization is changed in the liquid crystal panel, and display is made by the light passing through the other polarizing plate. In this prior art, the other polarizing plate at the light exit side of the pair of polarizing plates is a polarizing plate of high degree of polarization, and the one polarizing plate at the light incidence side is a polarizing plate of low degree of polarization.

In the liquid crystal panel 1 used in the prior arts, the counter electrode 17 contributing to actual display at the substrate member 6 side is realized by a transparent electrode such as ITO. As shown in FIG. 12, in the case where the reflector 4 is provided outside of the liquid crystal panel 1, the pixel electrodes 12 of the substrate member 5 side are also realized by transparent electrodes. The signal wirings 13 not directly contribute to actual display at the substrate member 5 side, but to which signals for display are supplied, scanning wirings 18 of substrate member 6 side, and HIM elements 14 of the substrate member 5 side are realized by a meal material of relatively small wring resistance so as not to cause delay of supplied signals, such as tantalum (Ta) and aluminum (Al).

However, these metal materials of small wiring resistance do not transmit light, and by disposing such metal materials on the substrates 11, 16, the TN type liquid crystal display device using this liquid crystal panel 1 is lowered in the aperture rate as compared with the TN type liquid crystal display device in which, for example, these wiring are also composed of transparent electrodes. The aperture rare refers to the ratio of the area of a light passing portion to the entire area of the display region of he device in the case of reflection type liquid crystal display device. The light passing portion includes, in the positive type, the confronting portion of the pixel electrode 12 and counter electrode 17 which is the portion contributing to the display in the display region, and the portion not confronting mutually to the display pixel electrode and counter electrode which are display electrodes, such as the gap between electrodes on the same substrate, that is, the always light passing portion regardless of application of voltage.

Namely, in the liquid crystal display device mentioned above, the incident light and the reflected light reflected by the reflector are blocked by the portion not transmitting light, and hence the transmittance and reflectance of the device are lowered. As a result, the brightness of the display screen drops, and the display quality of the liquid crystal display device deteriorates. In particular, the brightness of the background color is lowered.

As a method of raising the aperture rate of the liquid crystal display device, it may be considered to reduce the size of switching element or the like, or reduce the wire width of the metal wiring, but at the precision of the existing processing technique, when the size or wire width is further reduced, it is possible that breakage of metal wiring may be likely to occur. Further, when the size of the switching element is changed, the conditions about the design of the liquid crystal panel, such as the ratio of the element capacity and liquid crystal capacity may vary, and hence the design of the liquid crystal panel 1 must be largely revised.

In the reflection type liquid crystal display device, the light entered from outside passes through a pair of polarizing plates twice. The quantity of light passed through one polarizing plate is lowered to less than half as compared with the quantity of light before passing. Therefore, as compared with the transmission type liquid crystal display device designed to display by the light passed through a pair of polarizing plates only once, the light emitted from the reflection type liquid crystal display device is weak, and its display screen is dark. In the positive reflection type liquid crystal display device, moreover, the color of the background occupying the majority of the display area is white in the state of transmitting the light. As mentioned above, when displayed by the light lowered in the quantity of light, the background becomes dark. As a result, the entire display screen becomes dark, and hence the display quality further deteriorates. Therefore, as compared with the transmission type liquid crystal display device, it is demanded to increase the quantity of light emitted from the display screen and brighten the display screen. The prior art disclosed in the Japanese Unexamined Patent Publication JPA 6-281927 (1994) is an art to be applied to the transmission type liquid crystal display device, and when applied to the reflection type liquid crystal display device, the contrast and display screen are not improved to a practicable level.

SUMMARY OF THE INVENTION

It is hence a primary object of the invention to present a reflection type liquid crystal display device brighter in the display screen than in the conventional reflection type liquid crystal display device.

To achieve the object, the invention provides a reflection type liquid crystal display device comprising a liquid crystal panel holding a twisted nematic type liquid crystal layer sandwiched between a pair of light transmitting substrate members, the liquid crystal panel being interposed between a pair of polarizing plates, and a reflector for reflecting the light entering from the side of one polarizing plate, the reflector being disposed on the side of the other polarizing plate, the side not facing the liquid crystal panel, wherein one of the pair of substrate members comprises:

a light transmitting substrate, plural light transmitting pixel electrodes arrayed in a matrix form on the surface of the light transmitting substrate at the liquid crystal layer side, plural data signal wirings arrayed parallel to each other, to which data signals to be supplied to the plural pixel electrodes are given, plural switching elements for individually supplying the data signals given to the data signal wirings to the pixel electrodes and cutting off the supply of the data signals, and an orientation layer closest to the liquid crystal layer, and the other of the pair of substrate members comprises:

a light transmitting substrate, light transmitting counter electrodes provided in a region confronting at least the plural pixel electrodes of the surface of the light transmitting substrate at the liquid crystal layer side, plural light transmitting scanning signal wirings arrayed in the direction orthogonal to the plural data signal wirings, to which scanning signals to be supplied to the counter electrodes are given, and an orientation layer closest to the liquid crystal layer.

It is preferable in the invention that the degree of polarization of the first polarizing plate at the light incidence and exit side of one of the pair of polarizing plates is selected higher than the degree of polarization of the second polarizing plate of the reflector side.

It is preferable in the invention that the degree of polarization and the single transmittance of the first polarizing plate are selected to be 99.7% or more, and 45% or more, respectively, the degree of polarization of the second polarizing plate is selected so that the difference from the degree polarization of the first polarizing plate may be 1% or more, the reflectance of the reflector is selected to be 60% or more within a wavelength band of from 400 nm to 700 nm, the difference in reflectance between two wavelengths selected within the wavelength band is selected to be 6% or less, the product $\Delta n \cdot d$ of the refractive index $\Delta n$ of the liquid crystal material and the thickness d of the liquid crystal layer is selected in a range of from 0.3 μm to 0.5 μm, and the rate of a light passing region to the total display region is selected to be 92% or more.

According to the invention, in the reflection type liquid crystal display device, the liquid crystal panel interposed between the pair of polarizing plates has the structure that a TN type liquid crystal layer is sandwiched between a pair of light transmitting substrate members. One of the pair of polarizing plates is provided on the display screen side on which the light enters and exits. A reflector is provided to be opposed to the liquid crystal panel via the other polarizing plate.

The plural pixel electrodes provided on the surface of the light transmitting substrate of one substrate member facing the liquid crystal layer transmit light and are arranged in a matrix form. Data signals given to each pixel electrode are transmitted by any one of the data signal wirings laid parallel to each other. The data signals are supplied or cut off individually in each pixel electrode by plural switching elements provided between each pixel electrode and corresponding data signal wiring. Moreover the plural counter electrodes provided on the surface of the transmitting substrate of the other substrate member facing the liquid crystal layer transmit light and confront the pixel electrodes of the one substrate member. Scanning signals given to each counter electrode are arrayed in a direction orthogonal to the data signal wiring, and transmitted by one of plural scanning signal wirings having light permeability. Therefore, the light passing region of the other substrate member is larger than when the scanning signal wiring is composed of light shielding material.

Using the data signals and scanning signals given to the electrodes, the magnitude of the voltage applied to the pixel electrodes and counter electrodes is controlled. As a result, the molecular array of the liquid crystals existing between the both electrodes can be changed, and it is possible to change over whether optical rotation in the liquid crystal layer is performed or not. The orientation film formed on the electrodes and wirings existing on the liquid crystal layer side surface of each substrate member aligns the directions of molecular axes of the liquid crystal molecules in the liquid crystal layer, closest to the each substrate member, in a specific direction, when voltage is not applied to the electrodes.

The light passed through the polarizing plates of the pair of polarizing plates, at the light incidence and exit side vibrates in one direction and enters the liquid crystal panel. When voltage application is not carried out between the pixel electrodes and counter electrodes, the direction of polarization of this light is changed by 90 degrees, and when voltage is applied between the electrodes, the direction of polarization thereof is not changed. And then the light is emitted from the polarizing plate direction at the reflector side. When the direction of polarization of the exited light coincides with the transmission axis of the polarizing plate at the reflector side, the exited light passes through the polarizing plate. The passed light is reflected by the reflector disposed so as to be opposed to the liquid crystal panel via the polarizing plate, and passes again through the other polarizing plate on the reflector side, and enters the liquid crystal panel. When voltage application is not carried out between the electrodes, the direction of polarization of this light is changed in the liquid crystal panel, and this light passes through the polarizing plate at the light exit side, and is emitted outside. At this time, the display screen is white. On the other hand, when voltage is applied between the electrodes, the light is directly emitted, but does not pass through the polarizing plate at the reflector side. At this time, the display screen is black.

The light passing region of the other substrate member of the liquid crystal panel is larger than in the conventional other substrate member, and hence the rate of blocking of passing light decreases. Therefore, the aperture rate of the entire liquid crystal panel composed by including the other substrate member is increased, and the passing quantity of the light passing through this liquid crystal panel increases. As a result, the brightness of the display surface of the reflection type liquid crystal display device containing this liquid crystal panel is enhanced, so hat the display quality may be improved.

Also according to the invention, the degree of polarization of the first polarizing plate at the light incidence and exit side of one of the pair of polarizing plates is selected higher than the degree of polarization of the second polarizing plate at the reflector side. Therefore, the brightness of the display screen is further enhanced, and the display quality is much improved.

Also according to the invention, the first polarizing plate is selected to have a degree of polarization of 99.7% or more and a single transmittance of 45% or more, and the second polarizing plate is selected so that the difference between the degree of polarization of the second polarizing plate and the degree of polarization of the first polarizing plate may be 1% or more. Moreover, the reflector is selected so as to have a reflectance of 60% or more in the wavelength band of visible rays, be small in change of reflectance within the band, and be within 6% in the difference in reflectance between two arbitrary wavelengths.

The liquid crystal panel is designed so that the product $\Delta n \cdot d$ of the refractive index $\Delta n$ of the liquid crystal material and the thickness d of the liquid crystal layer may be in a range of 0.3 μm or more and 0.5 μm or less. As a result, in the TN type liquid crystal display device of positive reflection type, a liquid crystal panel of first minimum design in which the quantity of light emitted from the display screen is maximum when voltage application to the electrodes is not carried out and the liquid crystal layer is thin can be formed. It is hence possible to form a liquid crystal panel which is high in the response speed and suited to the active matrix drive system. Further, the liquid crystal panel is designed so that the rate of the light passing region to the entire display region, that is, the aperture rate may be 92% or more. Accordingly, the passing quantity of the light passing through the liquid crystal panel increases, and the color tone of the display screen, in particular, the lightness can be enhanced.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
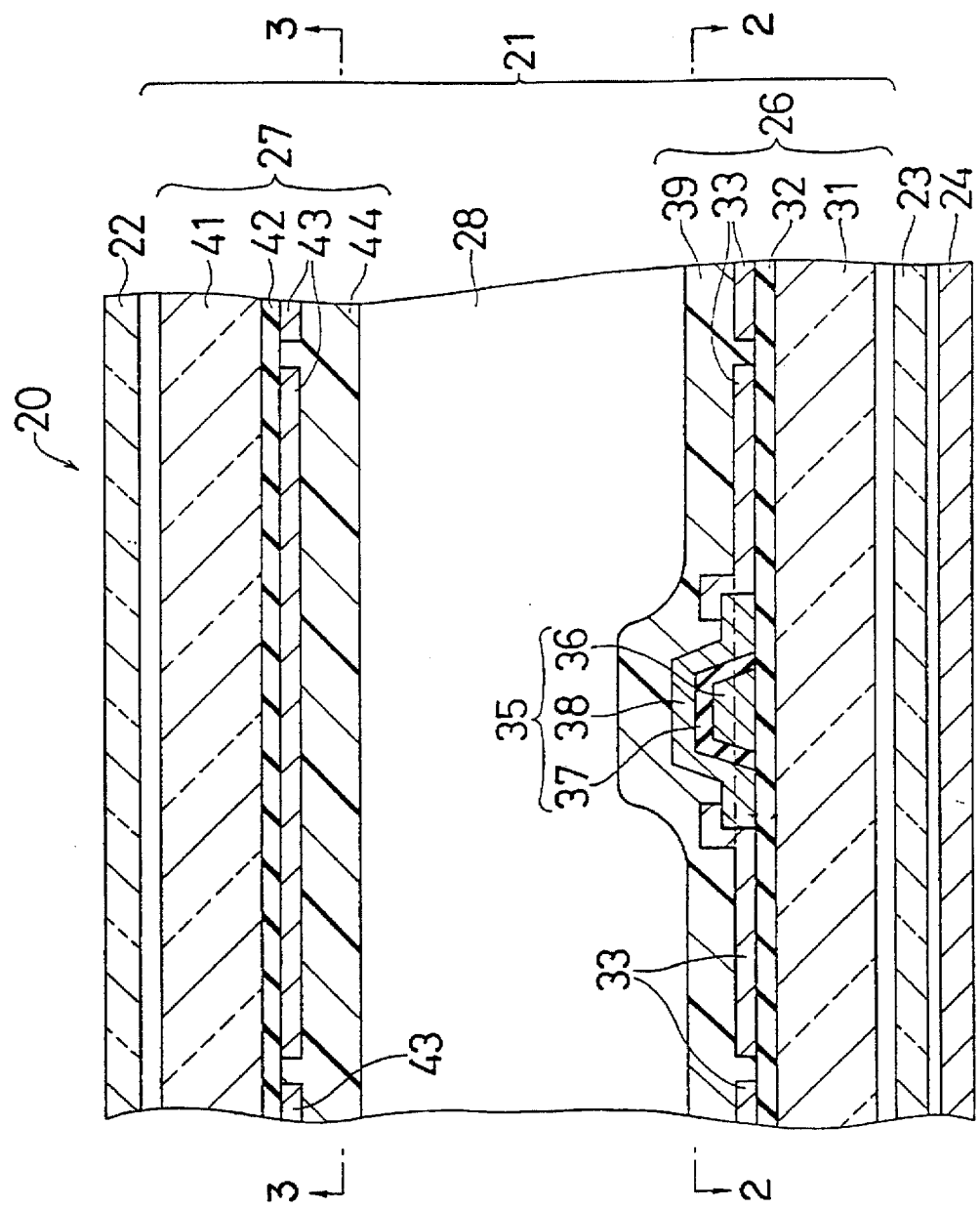
FIG. 1 is a sectional view showing a composition of one pixel of a liquid crystal display device 20 of an embodiment of the invention.

Now referring to the drawings, preferred embodiments of the invention are described below.

Figure 2:
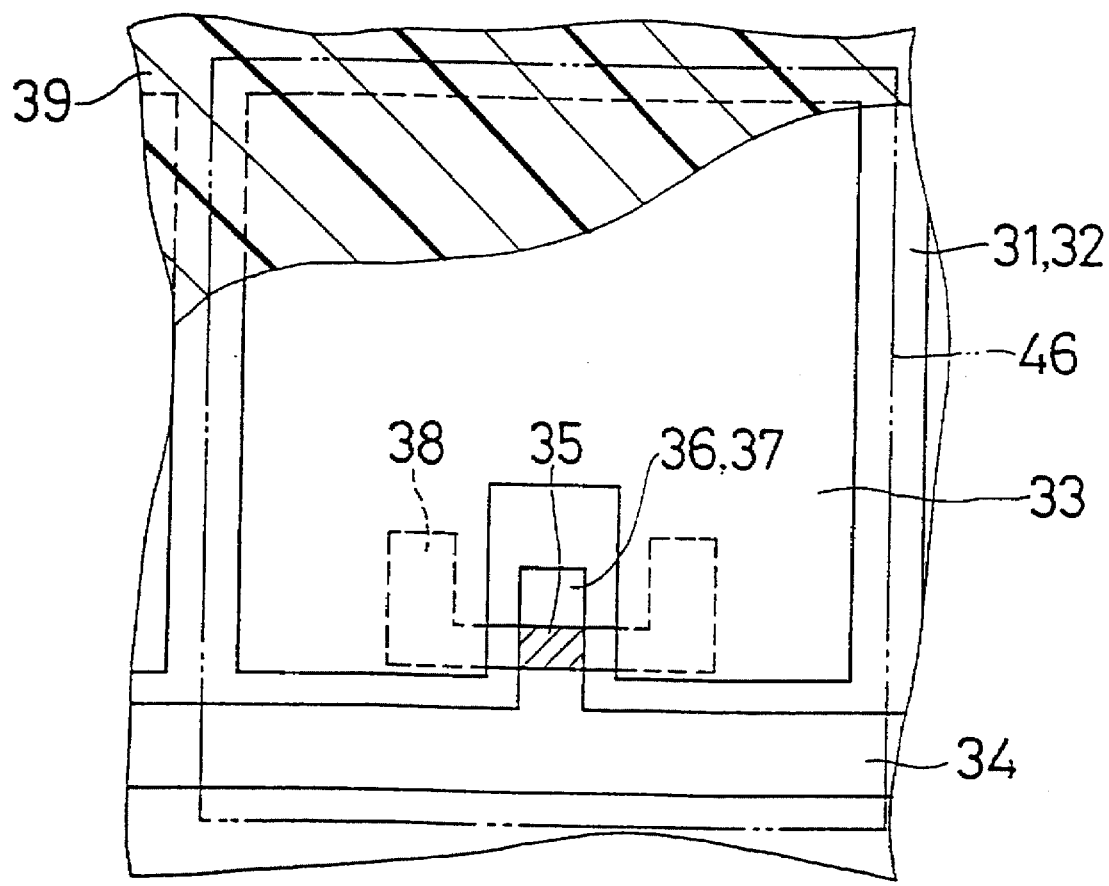
FIG. 2 is a sectional view of the liquid crystal display device 20 taken on line A—A of FIG. 1.
Figure 3:
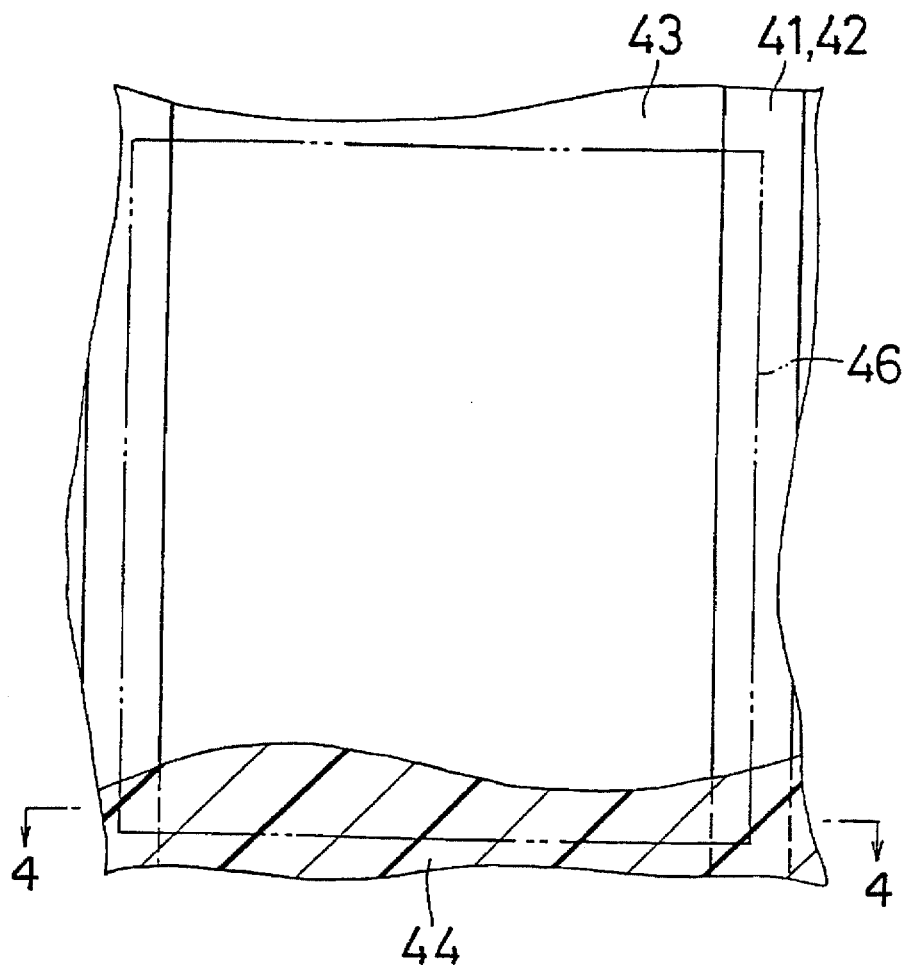
FIG. 3 is a sectional view of the liquid crystal display device 20 taken on line B—B of FIG. 1.
Figure 4:
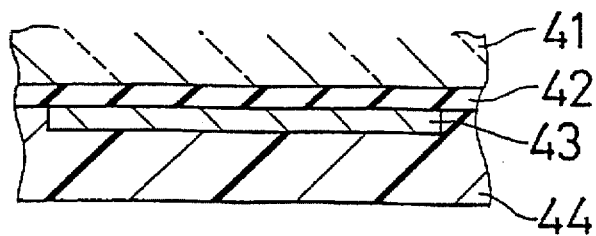
FIG. 4 is a sectional view of the liquid crystal display device 20 taken on line C—C of FIG. 3.

FIG. 1 is a sectional view showing a composition of one pixel of a liquid crystal display device 20 of an embodiment of the invention, and FIG. 2 is a sectional view of the liquid crystal display device 20 taken on line A—A of FIG. 1. FIG. 3 is a sectional view of the liquid crystal display device 20 taken on line B—B of FIG. 1, and FIG. 4 is a sectional view taken on line C—C of FIG. 3.

The liquid crystal display device 20 is constituted by sandwiching a liquid crystal panel 21 between a pair of polarizing plates 22, 23. A reflector 24 is provided to be opposed to the liquid crystal panel 21 via the polarizing plate 23. In this liquid crystal display device 20, the polarizing plate 22 side is the light incidence and exit side, that is, the display screen side. The liquid crystal panel 21 has a liquid crystal layer 28 sandwiched between substrate members 26, 27 provided with electrodes and orientation films on the surfaces of substrates 31, 41. The liquid crystal layer 28 is formed of, for example, a nematic type liquid crystal material.

An insulation layer 32 is formed on the surface facing the liquid crystal layer 28, of the substrate 31 which is disposed on the reflector 24 side of the liquid crystal device 20 and realized by a light transmitting material such as glass. Thereon are provided plural pixel electrodes 33, signal wirings 34 as data signal wirings, and MIM elements 35 as switching elements. The plural pixel electrodes 33 are realized by light transmitting ITO (indium-tin oxide) electrodes or the like, and are arranged in a matrix form. The plural signal wirings 34 are realized by metal wires of small wiring resistance such as tantalum, and are arranged mutually parallel at intervals in each row or column of the pixel electrodes 33. The plural MIM elements 35 are prepared as many as the pixel electrodes 33, and are used to connect the signal wirings 34 and pixel electrodes 33, and supply or cut off the data signals transmitted through the signal wirings 34 individually in each pixel electrode 33.

The MIM elements 35 are formed by sequential lamination of a lower electrode 36 connected to the signal wiring 34 and realized by a metal such as tantalum, an insulation layer 37 which is an anodic oxide film, realized by $Ta_2O_5$ or the like, and an upper electrode 38 connected to the pixel electrode 33 and realized by metal such as titanium.

An orientation film 39 is formed on the one surface of the substrate 31 forming pixel electrodes 33 and others. This orientation film 39 is oriented by rhombic deposition or rubbing process so that molecular axes of liquid crystal molecules may be aligned in one direction. The substrate 31, insulation film 32, pixel electrodes 33, signal wirings 34, MIM elements 35, and orientation film 39 compose the substrate member 26.

Moreover, an insulation layer 42 is formed on a surface of the substrate 41 which is disposed on a display screen side of the liquid crystal device 20 and realized by a light transmitting material such as glass, the surface facing the liquid crystal layer 28. Thereon is formed a band-shaped scanning electrode 43 realized by a light transmitting material such as ITO electrode. The scanning electrode 43 has such a structure that a counter electrode to be provided in a region confronting the pixel electrode 33 in the substrate member 26, and a scanning signal wiring for transmitting a scanning signal to the counter electrode are integrated into one. A plurality of scanning electrodes 43 are formed in a width exactly facing the full surface of the pixel electrodes 33 in one row or column, in a direction orthogonal to the signal wirings 34. On the one surface of the substrate 41 forming the scanning electrodes 43, an orientation film 44 is formed. The orientation film 44 is oriented same as mentioned above. The substrate 41, insulation film 42, scanning electrodes 43, and orientation film 44 compose the substrate member 27.

The substrate members 26, 27 are glued together keeping a space so as to face each other to form a cell of the liquid crystal panel. By injecting liquid crystal into the space of this cell, the liquid crystal panel 21 is formed. The region of one pixel of this liquid crystal panel 21 is indicated by alternate long and two short dashes line 46 in FIG. 2 and FIG. 3. By applying a predetermined voltage between the pixel electrode 33 and scanning electrode 43 corresponding to one pixel, the array of the liquid crystal molecular axes of the liquid crystal layer 28 existing between the both electrodes 33, 43 is changed, and the presence and absence of optical rotation are changed over to make a display.

Figure 5:
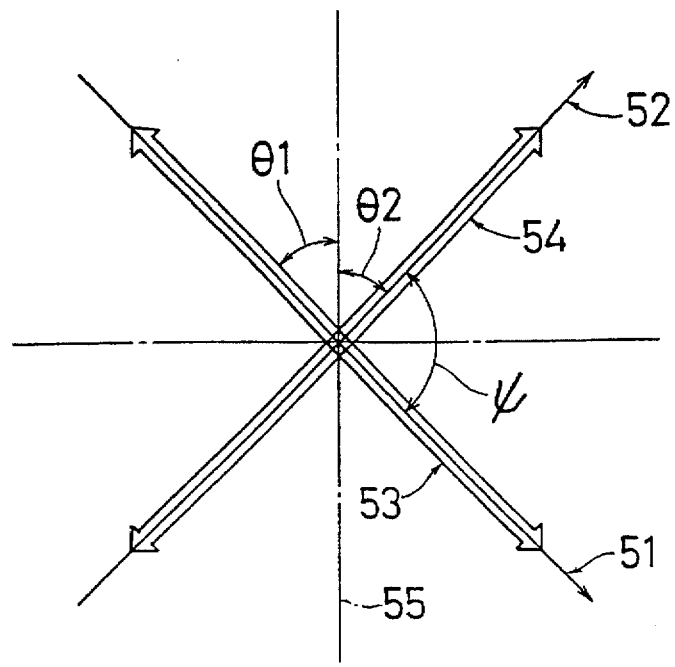
FIG. 5 is a diagram showing the relation between the polarization axes of first and second polarizing plates 22, 23 and the orientation treatment directions of substrate members 26, 27 of the liquid crystal display device 20 of FIG. 1.

FIG. 5 is a diagram showing the relation between the polarization axes 53, 54 of the first and second polarizing plates 22, 23 of the liquid crystal display device 20 of FIG. 1, and the orientation directions 51, 52 of the orientation films 39, 44 of the substrate members 26, 27.

Arrow 51 indicates the molecular orientation axis of the liquid crystal molecule closest to the orientation film 39, that is, the rubbing axis as the orientation process direction of the orientation film 39 of the substrate member 26 of the reflector 24 side. Arrow 52 indicates the molecular orientation axis of the liquid crystal molecule closest to the orientation film 44, that is, the rubbing axis of the orientation film 44 of the substrate member 27 of the display screen side. Arrow 53 indicates the transmission axis of the first polarizing plate 22 at the display screen side, and arrow 54 indicates the transmission axis of the second polarizing plate 23 at the reflector 24 side.

The molecular orientation axis 51 and transmission axis 53 are set at positions angularly displaced by angle θ1 in the counterclockwise direction, on the basis of the 6 o'clock–12 o'clock direction indicated by reference numeral 55, viewing the liquid crystal display device 20 from immediately above, that is, on the basis of the normal viewing angle direction-opposite viewing angle direction. The molecular orientation axis 52 and transmission axis 54 are set at positions displaced by angle θ2 in the clockwise direction, on the basis of the 6 o'clock–12 o'clock direction 55. In this embodiment, both angles θ1 and θ2 are selected to be 45 degrees. Therefore, the molecular orientation axis 51 and transmission axis 53 are set parallel to each other. Similarly, the molecular orientation axis 52 and transmission axis 54 are set parallel to each other, and the axes 51, 53, and axes 52, 54 are set so as to cross orthogonally.

The angle formed by the molecular orientation axis 51 and molecular orientation axis 52 is indicated by Ψ. In this embodiment, the angle Ψ is selected to be 90 degrees. Accordingly, the twist angle of the liquid crystal molecule is adjusted to 90 degrees. Therefore, when voltage application is not conducted between the pixel electrode 33 and scanning electrode 43, the light passing through this liquid crystal panel 21 is twisted by 90 degrees in the direction of polarization along the molecular orientation axis.

In the TN type liquid crystal panel including the switching elements as in this embodiment, it is necessary to consider the relation between the capacity CM and resistance RM of the switching elements and the capacity CL and resistance RL of the liquid crystal layer, and the refractive index Δn of the liquid crystal material on the optical design.

Figure 6:
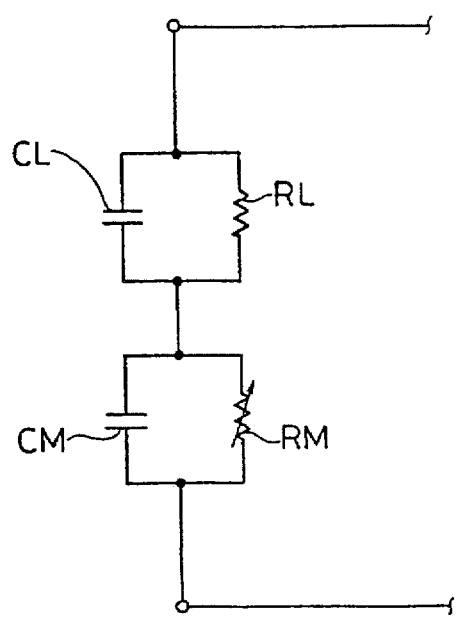
FIG. 6 is an equivalent circuit diagram of one pixel of a liquid crystal panel 21 of the liquid crystal display device 20 of FIG. 1.

FIG. 6 is an equivalent circuit of one pixel of the liquid crystal panel 21 of the liquid crystal display device 20 of FIG. 1. For example, in a liquid crystal display device using two-terminal elements as switching elements, and making use of nonlinearity of the element resistance RM, as the element capacity CM of the two-terminal elements becomes larger than the liquid crystal capacity CL of the liquid crystal layer, voltage may be applied to other pixels than the ones to which voltage was applied. As a result, the image contrast may be lowered, crosstalk may occur, and other problems may be caused. When MIM elements are used as two-terminal elements, to obtain a favorable element characteristic, it is known that the ratio of the element capacity CM and liquid crystal capacity CL should be set to 1:10.

Supposing the MIM element is composed of three layers, for example, a lower electrode 36 of Ta, an insulation film 37 of $Ta_2O_5$, and an upper electrode 38 of Ti, when the dielectric constant εr of the insulation film made of $Ta_2O_5$ is 24, the film thickness of the insulation film is 700 angstroms, and the size of MIM element is 5 μm×5 μm, the element capacity CM of the MIM element is 0.076 pF. At this time, to obtain a favorable element characteristic, the liquid crystal capacity CL must be 0.76 pF. Therefore, in the liquid crystal display device comprising MIM elements, with a pixel do size of, for example, 0.25 mm to 0.3 mm, the thickness d of the liquid crystal layer must be set to 4 μm to 10 μm, and the dielectric constant εr of the liquid crystal material must be 3 to 14.

In this liquid crystal display device, he characteristic for holding a high voltage is required in the liquid crystal, and hence fluorine derivative liquid crystal is generally used. Since the dielectric constant εr of the fluorine derivative liquid crystal is low, the thickness d of the liquid crystal layer must be small in order to form a liquid crystal panel capable of obtaining a favorable element characteristic. In the liquid crystal display device of active matrix drive system, to increase the response speed and utilize the characteristic of the switching elements, the thickness d of the liquid crystal layer is needed to be small.

Figure 7:
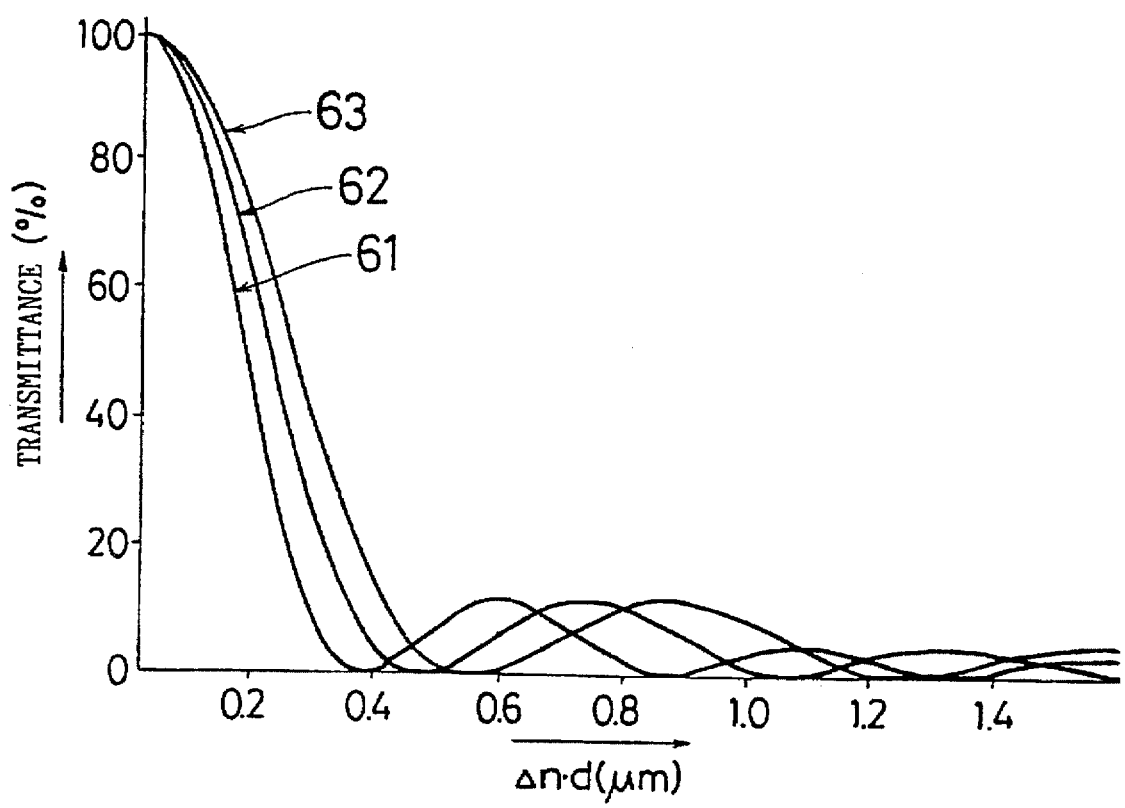
FIG. 7 is a graph showing the relation between the product Δn ·d of refractive index Δn of liquid crystal material and thickness d of a liquid crystal layer in the liquid crystal display device of normally black type, and transmittance of the device.

FIG. 7 is a graph showing the relation between the product Δn·d of the refractive index anisotropy Δn of the liquid crystal material and the thickness d of the liquid crystal layer, and the transmittance of the device. In the liquid crystal display device of normally black type, the TN type liquid crystal panel 21 is interposed between a pair of polarizing plates of which transmission axes are parallel to each other, and when voltage application is not conducted, the display screen does not pass light, and a black color is displayed. In this device, the transmittance T in applying no voltage is expressed by the following Gooch-Tarry formula.

$$T = \frac{\sin^2\left\{\frac{\pi}{2}\sqrt{\left(1+\left(\frac{2d\cdot\Delta n}{\lambda}\right)^2\right)}\right\}}{\left[1+\left(\frac{2d\cdot\Delta n}{\lambda}\right)^2\right]} \quad (1)$$

wherein λ is the wavelength of the light entering the device. Solid line 61 in FIG. 7 shows changes of the transmittance T when light of wavelength 450 nm, namely, a blue light enters. Solid line 62 shows changes of the transmittance T when light of wavelength 550 nm, namely, a green light enters. Solid line 63 shows changes of the transmittance T when light of wavelength 650 nm, namely is, a red light enters.

As seen from formula (1), the condition for obtaining a transmittance T of 0 is that 2d·Δn/λ is √3, √15, √35, . . . When 2d·Δn/λ is less than √3, the transmittance T rises suddenly, that is, light leak increases, and it is found that the contrast of the display screen is lowered. When 2d·Δn/λ is √3, the transmittance T is 0%, and light leak is zero. At this time, in the wavelength region of visible rays, selection of the product Δn·d in a range of 0.3 μm to 0.5 μm is found to be the condition for decreasing the light leak. The design of the liquid crystal display device for satisfying such condition is called as the first minimum design. Moreover, that the transmittance is 0% in the liquid crystal display device of normally black type indicates that the passing quantity of light emitted from the display screen of a specific area not applied with voltage is most in the liquid crystal display device of positive reflection type using the same liquid crystal panel. That is, the display screen is bright and the contrast is excellent.

Accordingly, in the liquid crystal display device for measurement used in the measurement mentioned later, fluorine derivative liquid crystal (ZLI-3021-000, produced by Merck) is used as the liquid crystal material, and the twist angle of the liquid crystal molecule is 90 degrees, and the thickness d of the liquid crystal layer is 4.5 μm. The dot size of pixel for composing the display screen is 0.3 mm×0.3 mm, the size of MIM element is 5 μm×6 μm, and the number of pixels in the display screen is 320×240.

Figure 8:
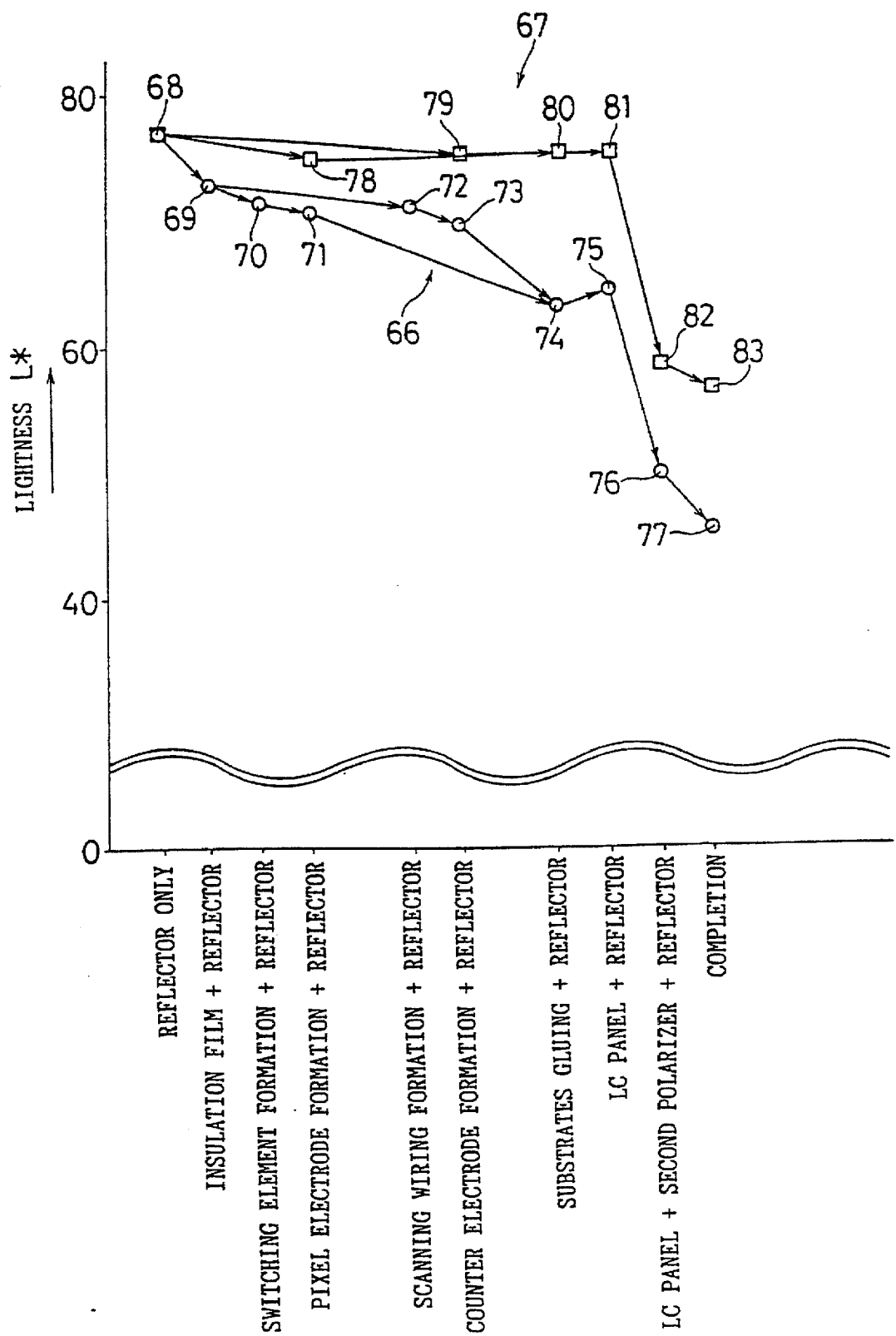
FIG. 8 is a graph showing changes in lightness L* of a display screen in every manufacturing process of a liquid crystal display device of a prior art.

FIG. 8 is a graph showing the results of measurement of lightness L* on the display screen of the liquid crystal display device of the prior art measured along the manufacturing process. Reference numeral 66 shows the change of lightness L* in the manufacturing process of the liquid crystal display device provided with switching elements, and 67 shows the change of lightness L* in the manufacturing process of the liquid crystal display device of simple matrix type provided with no switching elements.

In the manufacturing process of the liquid crystal display device provided with switching elements, first, an insulation film was formed on one side of each of a pair of light transmitting substrates made of glass or the like. A reflector was combined with the substrates, and the lightness L* of the portion corresponding to the display surface was measured, of which result is shown by reference numeral 69. The lightness L* is a psychological measurement defined in CLE 1976. The lightness L* indicated by reference numeral 69 is lower than the lightness L* measured by a reflector only indicated by reference numeral 68.

Successively, a metal film was deposited on the insulation film of a substrate composing one substrate member, and it was patterned by etching or the like to form signal wirings and switching elements. Using MIM elements as the switching elements, first a conductor film was deposited and patterned to form lower electrodes and signal wirings of MIM elements. Thereon, to cover the lower electrodes, an insulator film was deposited, and patterned to form an insulation film. Finally, a conductor film was deposited and patterned on the insulation film to form the upper electrodes of the MIM elements. The lightness L* when this one substrate and a reflector were combined is indicated by reference numeral 70. On this substrate, ITO film and others were formed and patterned, thereby forming pixel electrodes. The pixel electrodes were formed so as to overlap a part of the respective upper electrodes. The lightness L* when the substrate and reflector were combined is indicated by reference numeral 71. An orientation film or the like is formed on this one surface, and one substrate member of the liquid crystal panel is formed. As indicated by reference numerals 69 to 71, it is known that the lightness L* was lowered every time switching elements and pixel elements were formed on the substrate.

The scanning signal wirings were formed by depositing and patterning metal film of tantalum or the like on the insulation film of the substrate composing the other substrate member of the liquid crystal panel. The lightness L* when this substrate and reflector were combined is indicated by reference numeral 72. On this substrate, ITO film and others were formed and patterned, and counter electrodes were formed. The lightness L* when this substrate and reflector were combined is shown by reference numeral 73. On this one surface, orientation film and others were formed to form the other substrate member of the liquid crystal panel. As indicated by reference numerals 72, 73, it is found that the lightness L* was lowered gradually, same as in the one substrate member, every time scanning signal wirings and counter electrodes were formed on the substrate.

The one substrate member and the other substrate member were glued together keeping a space therebetween so that the surfaces provided with electrodes etc. face each other, thereby forming a cell of liquid crystal panel. The lightness L* when this cell and reflector were combined is indicated by reference numeral 74. By injecting liquid crystal into this space, the liquid crystal panel was formed. The lightness L* when this liquid crystal panel and reflector were combined is indicated by reference numeral 75. From the lightness L* indicated by reference numerals 71, 73, 74, it is found that the lightness L* was lowered significantly when glued with the substrate.

In the manufacturing process of the liquid crystal display device not including switching elements, for example, the liquid crystal display device of simple matrix type, ITO electrodes or other pixel electrodes are formed on one surface of the substrate composing one substrate member of the pair of substrates realized by glass or the like. The lightness L* when this substrate and reflector were combined is indicated by reference numeral 78. On one surface of the substrate for composing the other substrate member, ITO electrodes or other counter electrodes were formed. The lightness L* when this substrate and reflector were combined is indicated by reference numeral 79. By forming orientation film and others on the one surface of each of these substrates, each substrate member of the liquid crystal panel was formed. This one substrate member and other substrate member were glued together keeping a space therebetween so that the surfaces including electrodes etc. face each other, thereby forming a cell of liquid crystal panel. The lightness L, when this cell and reflector were combined is shown by reference numeral 80. By injecting liquid crystal into the space of this cell, the liquid crystal panel is formed. The lightness L* when this liquid crystal panel and reflector were combined is indicated by reference numeral 81. As indicated by the reference numerals 78 to 81, in the liquid crystal display device not having metal wirings such as switching elements, and large in aperture rate, it is known that the lightness L* is hardly lowered even when the substrates are glued together.

Reference numerals 76 and 82 indicate the lightness L* when a second polarizing plate is disposed between the liquid crystal panel comprising switching elements, or the liquid crystal panel not comprising switching elements, and the reflector. Reference numerals 77 and 83 indicate the lightness L* of the liquid crystal display device completed by disposing the first polarizing plate on the display screen side. In either liquid crystal display device, it is found that the lightness L* is lowered significantly when combined with a polarizing plate. Incidentally, the degree of lowering of lightness L* is greater in the liquid crystal display device provided with switching elements, and hence one of the causes of lowering of the lightness L* is found to be smallness of the aperture rate.

On the basis of these results, in order to minimize the drop of lightness L*, changes of lightness L* due to differences in aperture rate, changes of lightness L* due to differences of reflectors, and changes of lightness due to differences among polarizing plates were investigated.

Figure 9A:
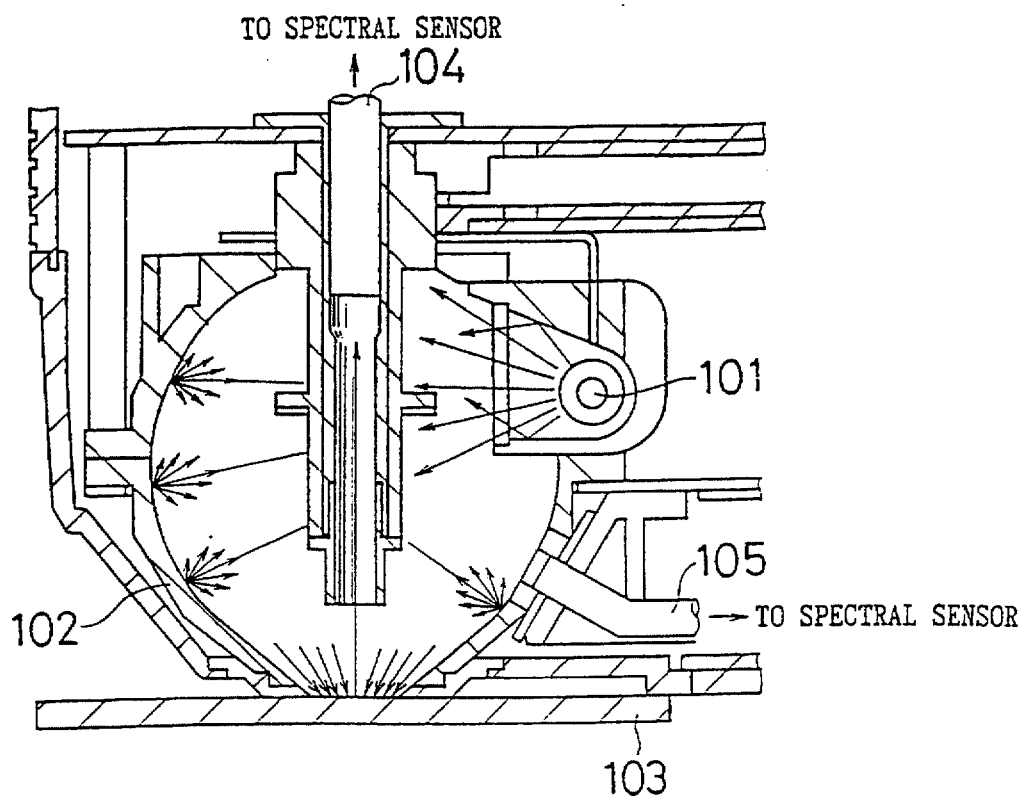
FIG. 9A is a simplified sectional view of a measuring device used in measurement of the lightness L*.
Figure 9B:
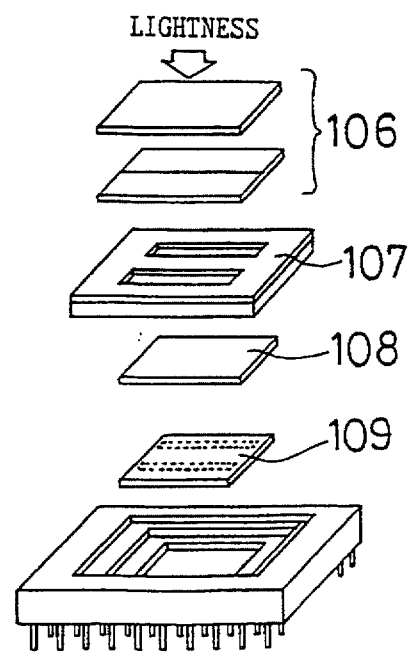
FIG. 9B is a perspective exploded view of a spectral sensor of the measuring device.

The lightness L* was measured by using a measuring device having a lighting/receiving optical system of normal reflection component removal type, conforming to the diffuse lighting/vertically receiving system of JIS Z 8722. FIG. 9A is a simplified sectional view of the measuring device, and FIG. 9B is an exploded perspective view of the spectral sensor of the measuring device.

In this measuring device, the light emitted from a light source 101 is diffused and reflected by the inner wall of a mixing box 102, and is uniformly diffused and illuminated on the display screen of a liquid crystal display device 103 disposed beneath in FIG. 9A. Of the exit light emitted from the display screen, the light in the vertical direction is led into a spectral sensor (not shown) through a fiber 104, and the intensity of light is measured at every wavelength. The measurement results are used as correction values for the measurements of the exit light. The light to be measured enters the spectral sensor in FIG. 9B from above. The wavelength band of the light is limited by a filter 106, and the light is divided in each wavelength by spectral means 108 through a shielding plate 107, and enters a receiving unit 109. In the receiving unit 109, an electric current proportional to the intensity of light entering at each wavelength is outputted.

In the measurement of the invention, the spectrophotometer CM-1000 produced by Minolta was used, and the measuring conditions of a viewing angle of 2 degrees and C light source are imposed. The C light source is a light source emitting light having the property nearly same as that of daylight containing a blue light, and this light is expressed as x=0.31006, y=0.31616 on the CIE chromaticity coordinates.

Figure 10:
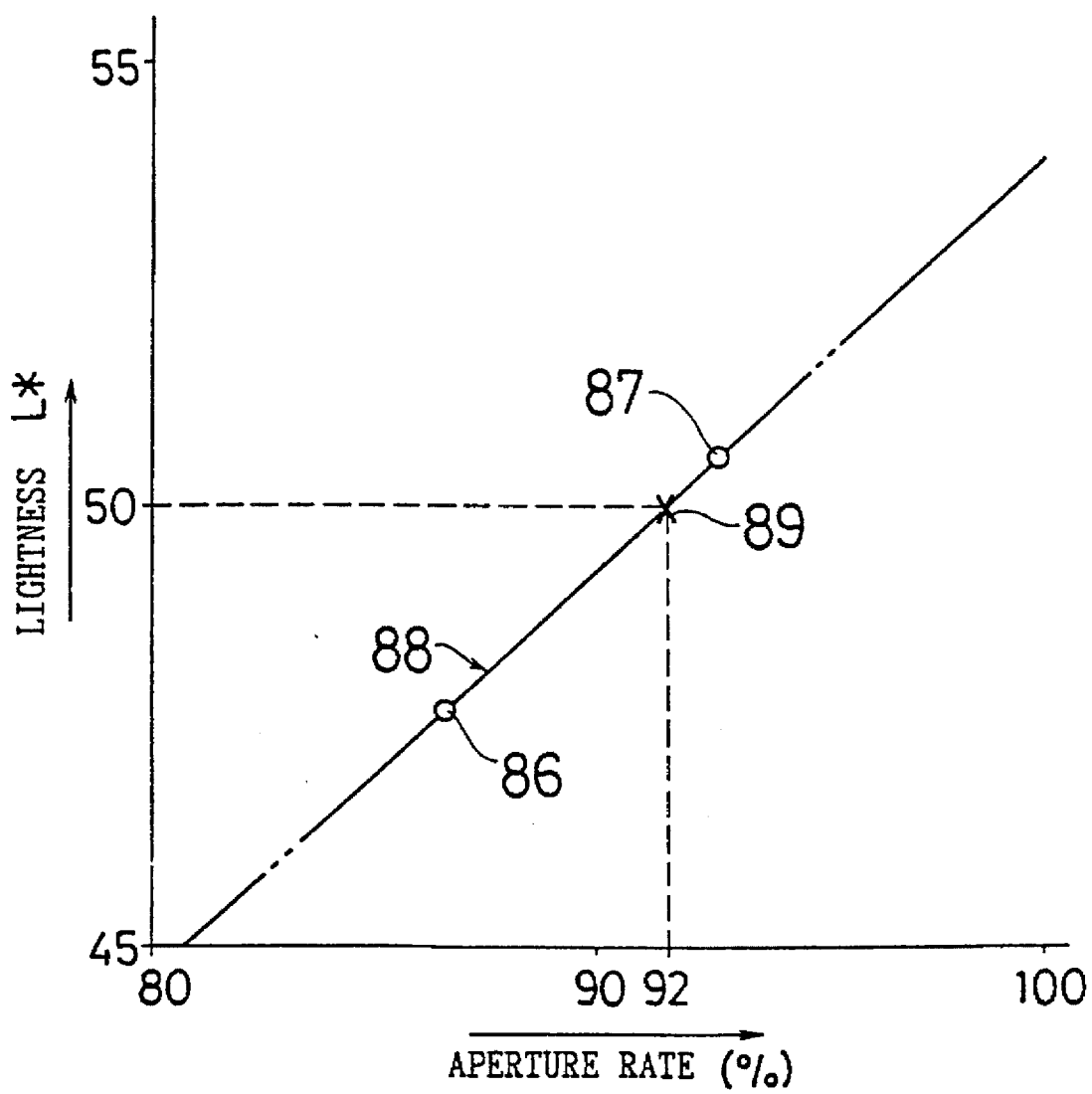
FIG. 10 is a graph showing the relation between the lightness L* of the display screen and the aperture rate in the liquid crystal display device.
Figure 12:
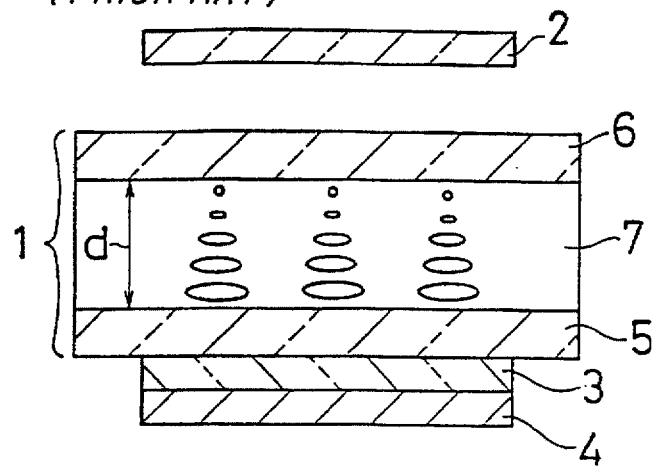
FIG. 12 is a sectional view showing a simplified constitution of a liquid crystal display device of prior art.
Figure 13:
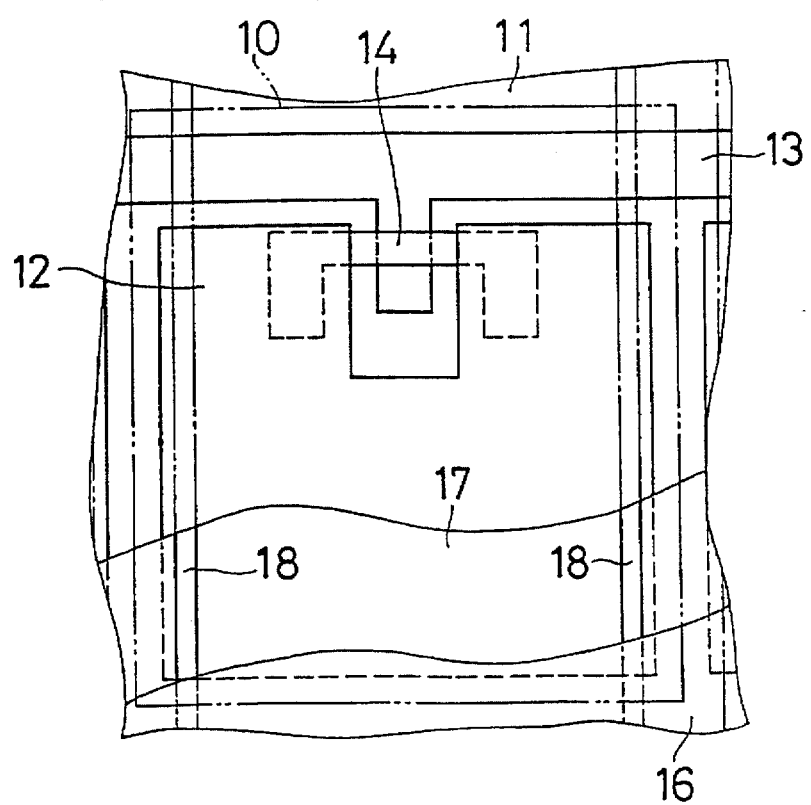
FIG. 13 is a partial plan view of the liquid crystal display device in FIG. 12.
Figure 14:
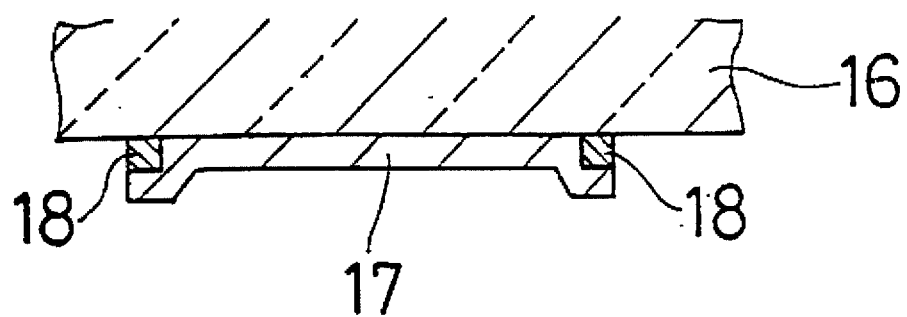
FIG. 14 is a sectional view of a substrate member of the liquid crystal display device in FIG. 12.

FIG. 10 is a graph showing the relation between the aperture rate and the lightness L*. The axis of ordinates denotes the lightness L*. The axis of abscissas denotes the aperture rage, of which unit is [%]. The white circle indicated by reference numeral 87 is the measured value of lightness L* of the display screen of the liquid crystal display device 20 of the embodiment shown in FIG. 1. The white circle indicated by reference numeral 86 is the measured value of lightness L* of the display screen of the liquid crystal display device of the prior art shown in FIG. 12. The types of polarizing plate, the axial angles, and the reflector used in these two liquid crystal display devices are identical. The configuration of the first polarizing plate and second polarizing plate is as shown in FIG. 5.

In the liquid crystal display device 20 of the embodiment, instead of the counter electrodes realized by transparent electrodes and scanning signal wrings realized by light impermeable metal material in the prior art, scanning electrodes 43 realized by transparent electrodes are provided. The scanning electrodes 43 function same as the counter electrodes and scanning signal wirings in the prior art. That is, the liquid crystal display device 20 of the embodiment is considered equivalent to the scanning signal wiring of the prior art realized by transparent electrodes. In the prior art, the light passing through the portion where the scanning signal wirings exist is blocked by the scanning signal wirings, but in the embodiment, since the scanning signal wirings as in the prior art are not provided, such light blocking does not occur. Therefore, in comparison with the liquid crystal display device of the prior art, the liquid crystal display device 20 of the embodiment is enhanced in the aperture rate as seen from the graph in FIG. 10.

Between the aperture rate and lightness L*, a proportional relation indicated by solid line 88 is considered to be established. When the lightness L* is smaller than 50, it is empirically known that the display screen becomes dark. As seen from this graph, the aperture rate of 92% or more is required, as indicated by reference numeral 89, in order to enhance the lightness L* of the display screen over 50. In other words, it is preferable that the aperture rate is selected to be in the range of from 92% to the ceiling value of 100%.

Next, the changes of lightness L* due to differences of reflectors will be described. Five reflectors of samples A to E were used. Sample A is a mirror plate, which is not prepared for a display device, and sample B is a white plate. Sample C is a reflector in which aluminum is deposited on a polyester mat film (manufactured by Nitto Denko). Sample D is a reflector in which silver is deposited on an aluminum film. Sample E is a reflector in which aluminum is deposited on an aluminum film (manufactured by Nitto Denko). Table 1 shows characteristics of samples A to E.

TABLE 1

| Type of reflector | Lightness L* | Chromaticity (a*, b*) | | Chroma saturation c* |
|---|---|---|---|---|
| | | a* | b* | |
| 1 Sample A | 31.28 | 0.08 | −1.78 | 1.78 |
| 2 Sample B | 95.65 | 2.04 | −4.84 | 5.25 |
| 3 Sample C | 76.03 | 0.14 | −3.22 | 3.22 |
| 4 Sample D | 84.17 | −0.68 | 0.71 | 0.98 |
| 5 Sample E | 86.53 | 0.04 | −3.46 | 3.46 |

The lightness L* and chromaticity (a*, b*) are psychological measurements defined in CIE 1976. The chroma saturation C* is defined in the following formula.

$$C^* = \sqrt{(a^{*2} + b^{*2})} \qquad (2)$$

Figure 11:
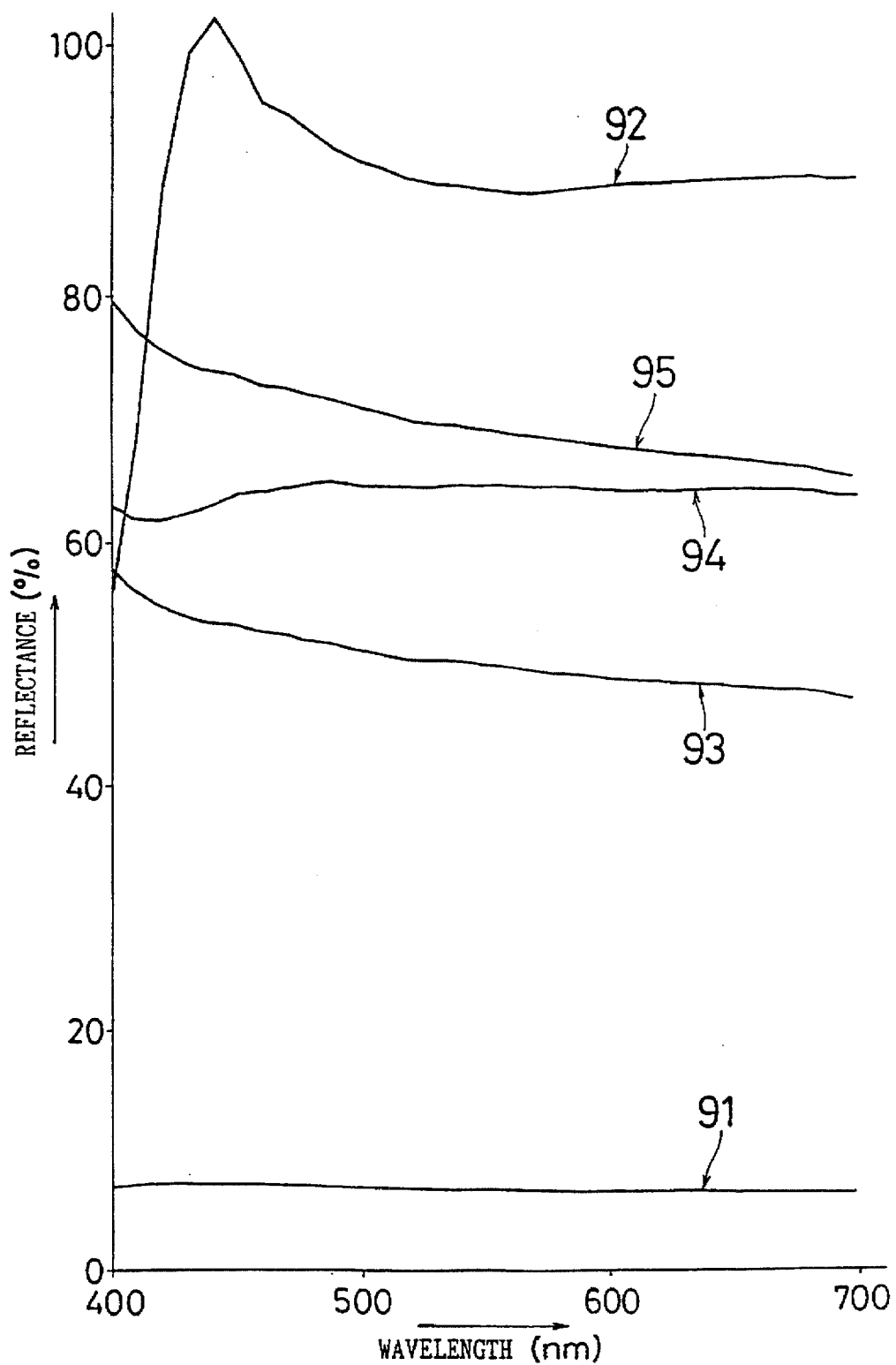
FIG. 11 is a graph showing the relation between the reflectance of a reflector and the wavelength of light.

FIG. 11 is a graph showing the relation of reflectance of reflector and wavelength of light. The axis of ordinates denotes the reflectance in the unit of [%], and the axis of abscissas denotes the wavelength in the unit of [nm]. The reflectance referred to herein indicates what is defined as spectral solid angle reflectance in JIS Z 8722. The graph indicated by solid line 91 shows the reflectance of sample A. The graph indicated by solid line 92 shows the reflectance of sample B. The graph indicated by solid line 93 shows the reflectance of sample C. The graph indicated by solid line 94 shows the reflectance of sample D. The graph indicated by solid line 95 shows the reflectance of sample E. By incorporating such reflectors into the liquid crystal display device for measurement, and the lightness L* and chromaticity (a*, b*) of the display screen were measured. In his measurement, the configuration of the first polarizing plate and second polarizing plate is as shown in FIG. 5. The types of the first and second polarizing plates were not changed even if the reflector was changed. The results are shown in Table 2.

TABLE 2

| Reflector | Lightness L* | Chromaticity (a*, b*) | |
|---|---|---|---|
| | | a* | b* |
| 1 Sample A | 15.41 | −3.38 | 1.30 |
| 2 Sample B | 42.24 | −7.37 | 4.71 |
| 3 Sample C | 47.24 | −8.35 | 4.55 |
| 4 Sample D | 52.14 | −10.37 | 9.06 |
| 5 Sample E | 49.53 | −8.97 | 5.31 |

As a result of measurement, in comparison with the lightness L* of sample E, the lightness L* of sample D was 5% higher. The lightnesses L* of samples A to C were smaller than that of sample E.

Sample A is extremely low in reflectance as compared with sample E. Sample B is extremely high in reflectance as compared with sample E, but fluctuations of reflectance are extremely large in the wavelength band of from 400 nm to 700 nm. Sample C and D are smaller in fluctuation of reflectance in the specified wavelength band as compared with sample E. Therefore, among the reflectors of samples C to E having similar characteristics, when reflecting white light mixing lights at various wavelengths, the brightness of the light is estimated greatest in the light reflected by the sample D small in fluctuation of reflectance.

Therefore, the brightness of the display screen of the liquid crystal display device can be enhanced by using a reflector having the same reflectance characteristic as the sample E, that is, the reflectance characteristic that the reflectance in the wavelength range of 400 nm to 700 nm is 60% or more, and the difference of reflectance at two given wavelengths selected within the same range is 6 % or less. In other words, it is preferable that the reflectance within the wavelength range of 400 nm to 700 nm is selected to be in the range of 60 % to the ceiling value of 100%, and the difference of reflectance at two given wavelengths selected within the same range is selected to be in the range of 0% to 6%.

Successively, by changing the single transmittance and degree of polarization of the first polarizing plate and the second polarizing plate, changes of lightness L* and contrast ratio Co of the display screen were measured, of which results are shown in Table 3 and Table 4. Table 3 shows the measurement results of lightness L*, and Table 4 shows the measurement results of contrast ratio Co. In this measurement, using the same liquid crystal display device for measurement, the first polarizing plate and the second polarizing plate are combined by varying the single transmittance and degree of polarization, and the lightness L* and contrast ratio Co of the display screen are measured. The single transmittance and degree of polarization referred to herein indicate what is defined in, for example, Liquid Crystal Handbook published by Nikkan Kogyo Shimbun.

TABLE 3

| | | Second Polarizer | | | | |
|---|---|---|---|---|---|---|
| | | | Sample Name | | | |
| | | | Sample 11 | Sample 12 | Sample 13 | Sample 14 |
| First Polarizer | Single transmittance [%] | | 46.5 | 47.5 | 46.0 | 44.5 |
| | Degree of polarization [%] | | 99.74 | 96.52 | 99.99 | 98.7 |
| Sample Name | Single transmittance [%] | Degree of polarization [%] | | | | |
| Sample 1 | 45.02 | 99.89 | 49.60 | 50.96 | 48.69 | 50.04 |
| Sample 2 | 44.55 | 99.97 | 48.75 | 50.54 | 48.14 | 49.53 |
| Sample 3 | 44.02 | 99.18 | 49.04 | 50.27 | 48.23 | 49.47 |
| Sample 4 | 46.0 | 99.99 | 48.73 | 50.11 | 47.88 | 49.07 |
| Sample 5 | 46.5 | 99.74 | 49.96 | 51.31 | 49.10 | 50.32 |
| Sample 6 | 44.5 | 97.8 | 50.25 | 51.55 | 49.45 | 50.77 |

TABLE 4

| | | Second Polarizer | | | | |
|---|---|---|---|---|---|---|
| | | | Sample Name | | | |
| | | | Sample 11 | Sample 12 | Sample 13 | Sample 14 |
| First Polarizer | Single transmittance [%] | | 46.5 | 47.5 | 46.0 | 44.5 |
| | Degree of polarization [%] | | 99.74 | 96.52 | 99.99 | 98.7 |
| Sample Name | Single transmittance [%] | Degree of polarization [%] | | | | |
| Sample 1 | 45.02 | 99.89 | 24.9 | 26.3 | 25.1 | 25.6 |
| Sample 2 | 44.55 | 99.97 | 18.2 | 24.6 | 21.7 | 24.7 |
| Sample 3 | 44.02 | 99.18 | 21.9 | 20.2 | 22.8 | 24.7 |
| Sample 4 | 46.0 | 99.99 | 23.0 | 24.3 | 22.8 | 24.8 |
| Sample 5 | 46.5 | 99.74 | 22.4 | 26.4 | 24.5 | 26.4 |
| Sample 6 | 44.5 | 97.8 | | | | (17.0) |

For the first polarizing plate, polarizing plates of samples 1 to 6 were used, and for the second polarizing plate, polarizing plates of samples 11 to 14 were used. The samples 1 to 6, and 11 to 14 have the single transmittances and degrees of polarization as shown in Tables 3 and 4.

When the contrast ratio Co is 25 or less, it is empirically known that the display quality of display screen is lowered. From the measurement results of contrast ratio Co shown in Table 4, it is found there are five combinations of polarizing plates showing the contrast ratio Co of 25 or more. In each combination, the first polarizing plate is sample 1 and the second polarizing plate is any one of samples 12 to 14, or the first polarizing plate is sample 5 and the second polarizing plate is sample 12 or 14.

From the measurement results of lightness L* shown in Table 3, it is found there are ten combinations of polarizing plates showing the lightness L* of 50 or more. In each combination, individually, the first polarizing plate is any of samples 1 to 6 and the second polarizing plate is sample 12, the first polarizing plate is sample 1 and the second polarizing plate is sample 14, the first polarizing plate is sample 6 and the second polarizing plate is sample 14, the first polarizing plate is sample 5 and the second polarizing plate is sample 14, or the first polarizing plate is sample 6 and the second polarizing plate is sample 11.

Therefore, the combination of the polarizing plates with a value of lightness L* of 50 or more and a value of contrast ratio Co of 25 or more, that is, the combination of polarizing plates capable of displaying favorably is available in four types, that is, the first polarizing plate is either sample 1 or 4, and the second polarizing plate is either sample 12 or 14.

Accordingly it is found that the lightness L* is 50 or more in most combinations of polarizing plates of which contrast ratio is 25 or more. To the contrary, in the combinations of polarizing plates of which lightness L* is 50 or more, it is known that the contrast ratio Co is 25 or more only in part of the combinations.

Hence, when the degree of polarization of the first polarizing plate is higher than the degree of polarization of the second polarizing plate, it is estimated that a favorable display is made. A preferable combination among preferred in the combinations of such polarizing plates is the combination of polarizing plates satisfying the conditions of the degree of polarization of the first polarizing plate of 99.7% or more, single transmittance of 45% or more, and the difference between the degree of polarization of the second polarizing plate and the degree of polarization of the first polarizing plate of 1% or more. In other words, it is preferable that the degree of polarization of the first polarizing plate is selected to be within the range of 99.7 to the ceiling value of 100%, and that the single transmittance is selected to be within 45% to the ceiling value of 100%. It is preferable that the difference in degree of polarization between the second and the first polarizing plate is selected to be in the range of 1% to 4%.

Thus, in the reflection type liquid crystal display device of the embodiment, the background, namely, the white portion of the region transmitting the light of the display screen is bright, and a favorable display with a large contrast ratio is realized.

Though, in the embodiment, MIM elements are used as the switching elements, other two-terminal elements such as varistors may be also used. Instead of two-terminal elements, if three-terminal elements such as TFT are used in the switching elements, a better display may be realized than in the conventional reflection type liquid crystal device using TFT.

In the embodiment, as an example of the transparent electrode for forming a scanning signal electrode including a scanning wiring, the ITC electrode widely used as transparent electrode at the present is used. In the ITO electrode, since the wiring resistance is large, although it is possible that the signal transmission be delayed when the screen size (4.7 inches) is increased from the liquid crystal display device of the embodiment, the screen size can be freely expanded if transparent electrodes and small wiring resistance can be used.

In the embodiment, the liquid crystal display device of monochromatic display is explained, but the invention may be also applied in an embodiment of color liquid crystal display device using color filter and others. In this case, too, the same effects as above are obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reflection type liquid crystal display device comprising a liquid crystal panel holding a twisted nematic type liquid crystal layer sandwiched between a pair of light transmitting substrate members, the liquid crystal panel being interposed between a pair of polarizing plates, and a reflector for reflecting the light entering from the side of one polarizing plate, the reflector being disposed on the side of the other polarizing plate, the side not facing the liquid crystal panel;

wherein one of the pair of substrate members comprises:
a light transmitting substrate,
plural light transmitting pixel electrodes arrayed in a matrix form on the surface of the light transmitting substrate at the liquid crystal layer side,
plural data signal wirings arrayed parallel to each other, to which data signals to be supplied to the plural pixel electrodes are given,
plural switching elements for individually supplying the data signals given to the data signal wirings to the pixel electrodes and cutting off the supply of the data signals, and an orientation layer closest to the liquid crystal layer;

wherein the other of the pair of substrate members comprises:
a light transmitting substrate,
light transmitting counter electrodes provided in a region confronting at least the plural pixel electrodes of the surface of the light transmitting substrate at the liquid crystal layer side,
plural light transmitting scanning signal wirings arrayed in the direction orthogonal to the plural data signal wirings, to which scanning signals to be supplied to the counter electrodes are given, and
an orientation layer closest to the liquid crystal layer; and wherein the degree of polarization of the first polarizing plate at the light incidence and exit side of one of the pair of polarizing plates is selected higher than the degree of polarization of the second polarizing plate of the reflector side.

2. The device of claim 1, wherein the degree of polarization and the single transmittance of the first polarizing plate are selected to be 99.7% or more, and 45% or more, respectively, wherein the degree of polarization of the second polarizing plate is selected so that the difference from the degree of polarization of the first polarizing plate may be 1% or more, wherein the reflectance of the reflector is selected to be 60% or more within a wavelength band of from 400 nm to 700 nm, wherein the difference in reflectance between two wavelengths selected within the wavelength band is selected to be 6% or less, wherein the product $\Delta n \cdot d$ of the refractive index $\Delta n$ of the liquid crystal material and the thickness d of the liquid crystal layer is selected in a range of from 0.3 μm to 0.5 μm, and wherein the rate of a light passing region to the total display region is selected to be 92% or more.

3. A reflection type liquid crystal display device comprising a liquid crystal panel holding a twisted nematic type liquid crystal layer sandwiched between a pair of light transmitting substrate members, the liquid crystal panel being interposed between a pair of polarizing plates, and a reflector for reflecting the light entering from the side of one polarizing plate, the reflector being disposed on the side of the other polarizing plate, the side not facing the liquid crystal panel and wherein the degree of polarization of the first polarizing plate at the light incidence and exit side of one of the pair of polarizing plates is selected higher than the degree of polarization of the second polarizing plate of the reflector side.

4. The device of claim 3, wherein the degree of polarization and the single transmittance of the first polarizing plate are selected to be 99.7% or more, and 45% or more, respectively, wherein the degree of polarization of the second polarizing plate is selected so that the difference from the degree of polarization of the first polarizing plate may be 1% or more, wherein the reflectance of the reflector is selected to be 60% or more within a wavelength band of from 400 nm to 700 nm, wherein the difference in reflectance between two wavelengths selected within the wavelength band is selected to be 6% or less, wherein the product $\Delta n \cdot d$ of the refractive index $\Delta n$ of the liquid crystal material and the thickness d of the liquid crystal layer is selected in a range of from 0.3 μm to 0.5 μm, and wherein the rate of a light passing region to the total display region is selected to be 92% or more.

* * * * *